US011669936B2

(12) United States Patent
Tokunaga et al.

(10) Patent No.: US 11,669,936 B2
(45) Date of Patent: Jun. 6, 2023

(54) VEHICLE-RELATED OUTPUT PROGRAM, SYSTEM, AND METHOD

(71) Applicant: KAWASAKI MOTORS, LTD., Akashi (JP)

(72) Inventors: Hisato Tokunaga, Nishinomiya (JP); Hirotoshi Shimura, Akashi (JP); Hisanosuke Kawada, Kobe (JP); Toshiyuki Tsubone, Kobe (JP); Masanori Kinuhata, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/228,026

(22) Filed: Apr. 12, 2021

(65) Prior Publication Data
US 2021/0319535 A1 Oct. 14, 2021

(30) Foreign Application Priority Data

Apr. 13, 2020 (JP) .............................. JP2020-071451

(51) Int. Cl.
*G06T 3/60* (2006.01)
*G06F 3/14* (2006.01)
*H04L 67/12* (2022.01)

(52) U.S. Cl.
CPC .................. *G06T 3/60* (2013.01); *G06F 3/14* (2013.01); *H04L 67/12* (2013.01)

(58) Field of Classification Search
None
See application file for complete search history.

(56) References Cited

U.S. PATENT DOCUMENTS

| 10,063,836 | B2 * | 8/2018 | Popham | H04N 7/183 |
| 2015/0274016 | A1 * | 10/2015 | Kinoshita | B60R 1/00 |
| | | | | 701/36 |
| 2017/0103571 | A1 * | 4/2017 | Beaurepaire | G06F 3/011 |
| 2019/0180525 | A1 * | 6/2019 | Matsuda | G07C 5/085 |

FOREIGN PATENT DOCUMENTS

JP 2019105909 A 6/2019

OTHER PUBLICATIONS

Saccon et al.; "A Virtual Rider for Motorcycles: An Approach Based on Optimal Control and Maneuver Regulation;" IEEE; ISCCSP 2008, Malta, Mar. 12-14, 2008; pp. 243-248 (Year: 2008).*

* cited by examiner

*Primary Examiner* — Edward Martello
(74) *Attorney, Agent, or Firm* — Alleman Hall Creasman & Tuttle LLP (57) ABSTRACT

A vehicle-related output program causes a computer to execute: a first receiving step of receiving a vehicle identification information piece transmitted from a vehicle; a second receiving step of receiving a vehicle state information piece transmitted from the vehicle; a calculating step of generating, as an output information piece, a result of predetermined calculation performed based on the vehicle state information piece, the predetermined calculation changing depending on a type indicated by the vehicle identification information piece; and an outputting step of outputting the output information piece.

17 Claims, 7 Drawing Sheets

VEHICLE-RELATED OUTPUT PROGRAM, SYSTEM, AND METHOD

CROSS-REFERENCE TO RELATED APPLICATION

This application claims priority to and the benefit of Japanese Patent Application No. 2020-071451 filed on Apr. 13, 2020, the entire disclosure of which is incorporated herein by reference.

BACKGROUND OF THE INVENTION

Field of the Invention

The present disclosure relates to a vehicle-related output program, system, and method.

Description of the Related Art

Japanese Laid-Open Patent Application Publication No. 2019-105909 discloses a technique of storing traveling information pieces of a plurality of vehicles in a server or the like. Specifically, a plurality of mobile information terminals (for example, smartphones) carried by a plurality of users who are driving vehicles receive the traveling information pieces from the corresponding vehicles. Then, the traveling information pieces of the users are transmitted from the mobile information terminals to the server and are stored in a database of the server.

However, many elements, such as vehicle appearances, structures, and vehicle weights, differ depending on the types of the vehicles. Therefore, when providing calculation results of the stored traveling information pieces to the users, the calculation results may differ depending on the types of the vehicles. When the users input information pieces corresponding to the respective types of the vehicles in order to obtain appropriate calculation results in accordance with the types of the vehicles, the convenience of the users deteriorates.

SUMMARY OF THE INVENTION

A vehicle-related output program according to one aspect of the present disclosure causes a computer to execute: a first receiving step of receiving a vehicle identification information piece transmitted from a vehicle; a second receiving step of receiving a vehicle state information piece transmitted from the vehicle; a calculating step of generating, as an output information piece, a result of predetermined calculation performed based on the vehicle state information piece, the predetermined calculation changing depending on a type indicated by the vehicle identification information piece; and an outputting step of outputting the output information piece.

According to the above configuration, since the output information piece calculated based on the vehicle state information piece transmitted from the vehicle corresponds to the type indicated by the vehicle identification information piece, the appropriate output information piece corresponding to the vehicle identification information piece can be output. In this case, since the output information piece conforming to the type of the vehicle is generated based on the vehicle identification information piece transmitted from the vehicle, the user does not have to input the type of the vehicle. Therefore, the appropriate output information piece corresponding to the type of the vehicle can be output while preventing the deterioration of the convenience of the user.

It should be noted that the vehicle-related output program may be stored in a non-transitory storage device. The storage device is a computer-readable device incorporated in or externally attached to a computer (for example, a mobile information terminal, a personal computer, or a server). The storage device may be, for example, a hard disk, a flash memory, or an optical disk. The vehicle-related output program stored in the storage device may be executed by a computer to which the storage device is directly connected or may be downloaded to and executed by a computer connected to the storage device through a network (for example, the Internet).

A vehicle-related output system according to another aspect of the present disclosure includes: an input unit configured to receive a vehicle identification information piece transmitted from a vehicle and a vehicle state information piece transmitted from the vehicle; a calculation unit configured to acquire, from a storage unit, a conformity information piece set so as to correspond to the vehicle identification information piece, perform predetermined calculation based on the vehicle state information piece and the conformity information piece, and generate a result of the calculation as an output information piece, the predetermined calculation changing depending on a type indicated by the vehicle identification information piece; and an output unit configured to output the output information piece.

A vehicle-related output method according to yet another aspect of the present disclosure includes: a first receiving step of receiving a vehicle identification information piece transmitted from a vehicle; a second receiving step of receiving a vehicle state information piece transmitted from the vehicle; a calculating step of generating, as an output information piece, a result of predetermined calculation performed based on the vehicle state information piece, the predetermined calculation changing depending on a type indicated by the vehicle identification information piece; and an outputting step of outputting the output information piece.

DESCRIPTION OF THE PREFERRED EMBODIMENTS

Hereinafter, an embodiment will be described with reference to the drawings.

Figure 1:
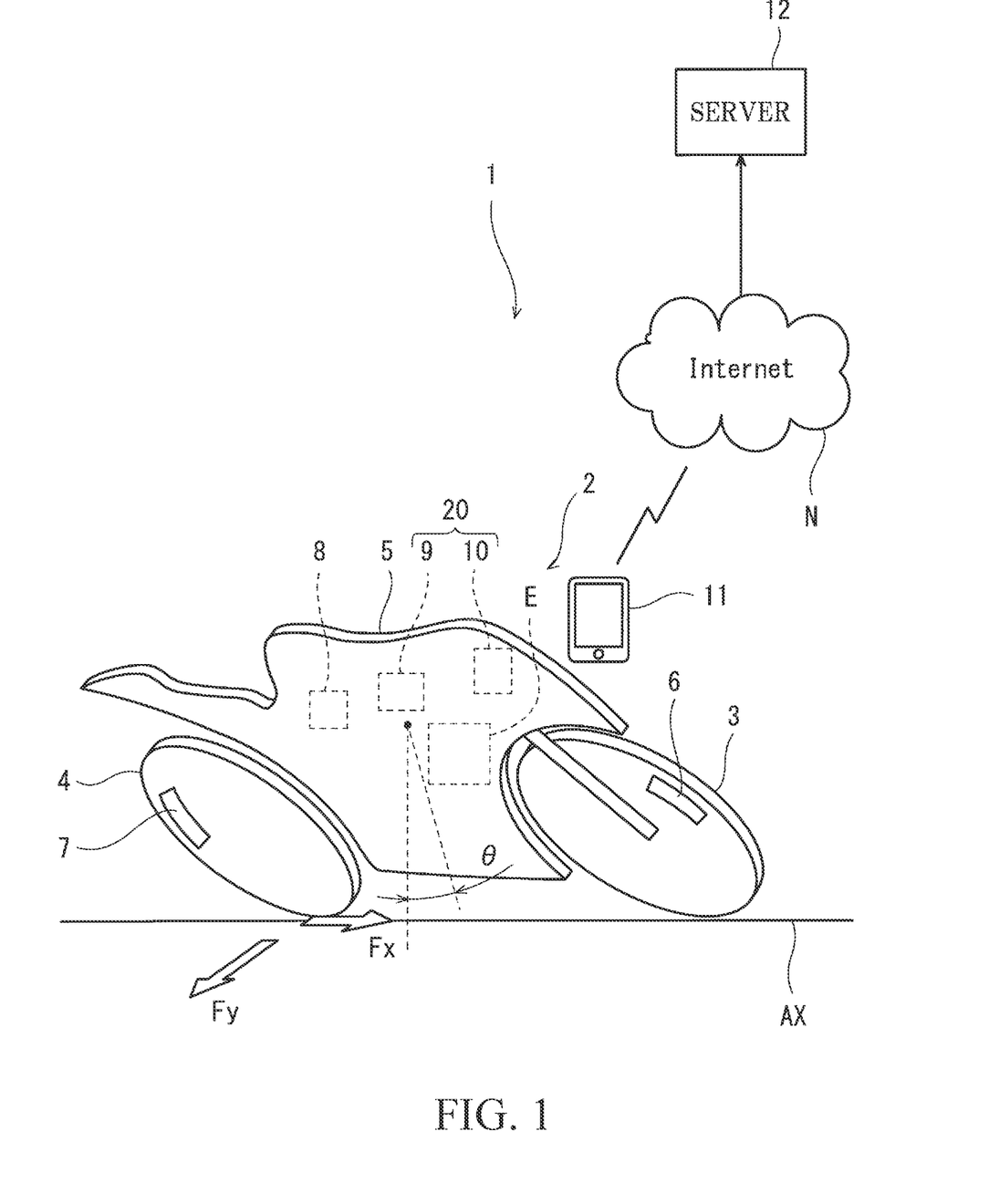
FIG. 1 is an entire diagram showing, for example, a vehicle to which a vehicle-related output system according to an embodiment is applied.

FIG. 1 is an entire diagram showing a vehicle 2 to which a vehicle-related output system 1 according to the embodiment is applied. As shown in FIG. 1, although the vehicle 2 to which the vehicle-related output system 1 is applied is not especially limited, the vehicle 2 is preferably a lean vehicle (for example, a motorcycle) which turns while inclining (leaning) a vehicle body thereof in a roll direction.

The lean vehicle 2 includes a front wheel 3 (driven wheel), a rear wheel 4 (driving wheel), and a vehicle body 5 supported by the front wheel 3 and the rear wheel 4. The lean vehicle 2 turns in a state (lean state) in which the vehicle body 5 is inclined in the roll direction (left-right direction) about a front-rear axis AX passing through a front wheel ground contact point and a rear wheel ground contact point. An inclination angle of the vehicle body 5 about the front-rear axis AX based on an upright state of the vehicle body 5 is called a lean angle θ (the lean angle θ is zero in the upright state). An entire movable body including a driver and the vehicle 2 travels at the inclination angle which balances centrifugal force, and with this, the lean vehicle 2 turns while maintaining the lean state.

The vehicle 2 includes a prime mover E configured to generate driving force for traveling. The prime mover E is, for example, an engine (internal combustion engine), an electric motor, or a combination of an engine and an electric motor. Driving force generated by the prime mover E is applied to the rear wheel 4 through a power transmission mechanism. The lean vehicle 2 includes a hydraulic brake equipment configured to brake the front wheel 3 and the rear wheel 4. The brake equipment includes a front brake unit 6 configured to brake the front wheel 3, a rear brake unit 7 configured to brake the rear wheel 4, and a brake control device 8 configured to control the front brake unit 6 and the rear brake unit 7. The front brake unit 6 and the rear brake unit 7 independently operate and respectively apply braking force proportional to braking pressure to the front wheel 3 and the rear wheel 4.

The lean vehicle 2 includes a controller 9 (ECU). The controller 9 may control the driving force of the prime mover E. The controller 9 may perform control (ABS control) of the brake control device 8. The controller 9 may control vehicle body behavior (a suspension and a steering). In order to control the vehicle 2, information pieces (sensor information pieces) detected by a plurality of below-described sensors mounted on the vehicle body 5 are input to the controller 9.

The lean vehicle 2 includes a meter device 10. The meter device 10 is communicably connected to the controller 9. The meter device 10 includes a display unit configured to display information pieces (for example, a vehicle speed and a prime mover rotational frequency) to the driver based on information pieces received from the controller 9. The meter device 10 includes a wireless communication unit configured to perform wireless communication through predetermined short-range wireless communication technology (for example, Bluetooth (trademark)). The controller 9 and the meter device 10 constitute a vehicle control device 20. The meter device 10 selects some of the information pieces received from the controller 9 and the like and periodically transmits the selected information pieces to an external device through the wireless communication unit.

A mobile information terminal 11 (computer) accompanies the driver or the lean vehicle 2. For example, the driver of the lean vehicle 2 carries the mobile information terminal 11 (for example, a smartphone) or arranges the mobile information terminal 11 at a predetermined position of the lean vehicle 2. The mobile information terminal 11 can perform wireless communication with the meter device 10 through the predetermined short-range wireless communication technology (for example, Bluetooth (trademark)). The mobile information terminal 11 is communicable with a server 12 (computer) through a communication network N (for example, the Internet).

It should be noted that a device configured to transmit information pieces from the lean vehicle 2 to the mobile information terminal 11 is not limited to the meter device 10 and may be another device (for example, a wireless communication unit connected to the controller 9). The controller 9 may be constituted by a single ECU or a plurality of distributed ECUs. The meter device 10 and the mobile information terminal 11 may perform wired communication.

Figure 2:
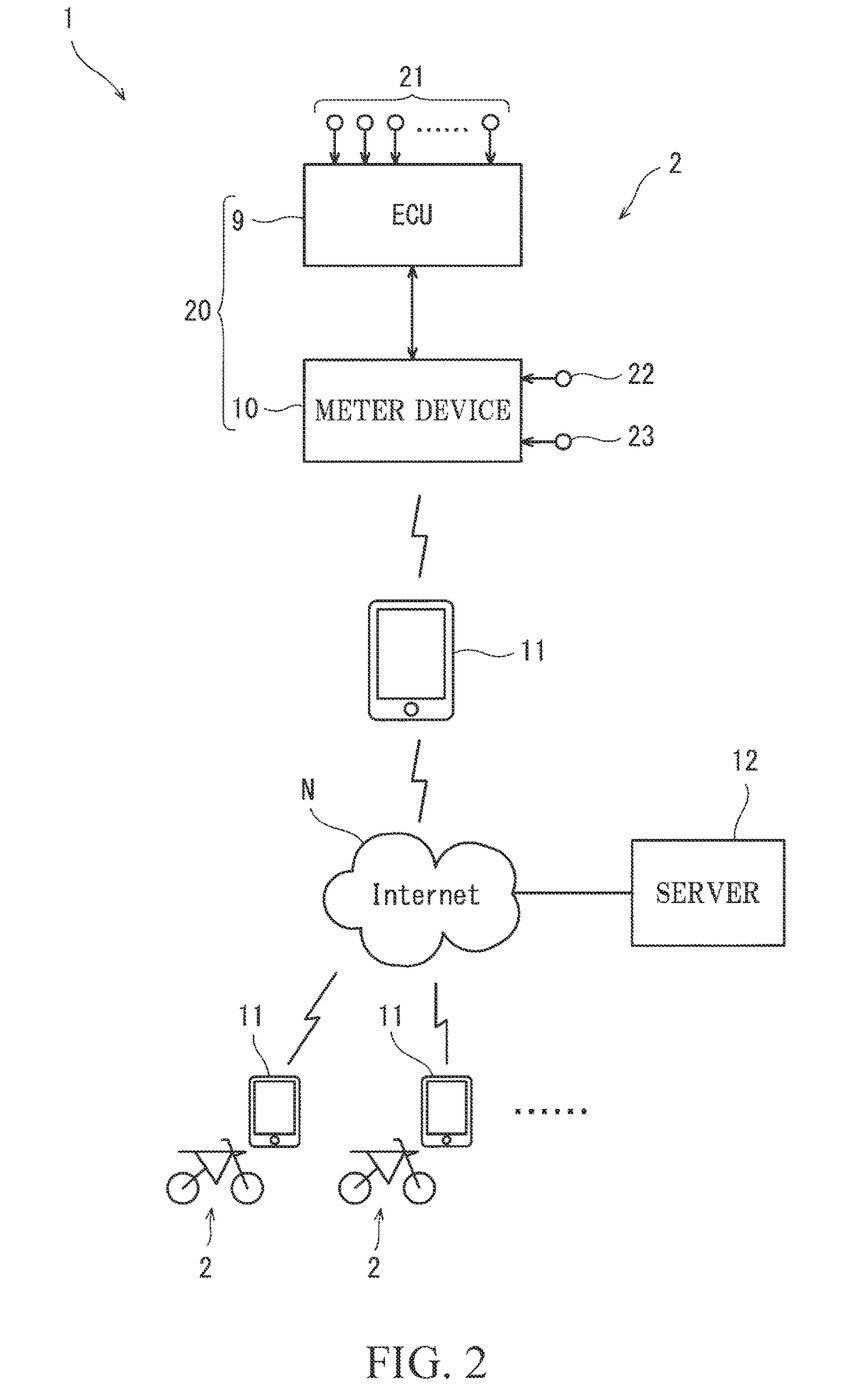
FIG. 2 is a schematic diagram showing the vehicle-related output system of FIG. 1.

FIG. 2 is a schematic diagram showing the vehicle-related output system 1 of FIG. 1. As shown in FIG. 2, a plurality of traveling state sensors 21, a satellite positioning sensor 22, a user manipulating unit 23, and the like are electrically connected to the vehicle control device 20. Specifically, the traveling state sensors 21 are connected to the controller 9, and the satellite positioning sensor 22 and the user manipulating unit 23 are connected to the meter device 10.

The traveling state sensors 21 are mounted on the lean vehicle 2 and detect physical quantities indicating traveling states of the lean vehicle 2. The traveling state may include an information piece indicating a vehicle state which changes with time during traveling. It should be noted that each of the traveling state sensors 21 is not limited to a sensor configured to detect a continuous value of a voltage or the like and may be a switch configured to detect an on state or an off state. Traveling state sensor information pieces detected by the traveling state sensors 21 are input to the controller 9. The controller 9 periodically transmits the traveling state sensor information pieces to the meter device 10. The traveling states detected by the traveling state sensors 21 may be physical quantities related to vehicle body motion, such as the position, posture, and motion amount of the vehicle 2. Moreover, the traveling states of the traveling state sensors 21 may be a vehicle body manipulation amount of the driver which contributes to a change in the vehicle body motion and a control amount of an actuator which contributes to the change in the vehicle body motion. Examples of the actuator include an electronic control throttle, a fuel injector, a spark plug, and an ABS device and may include an electronic control suspension, an electronic control steering, and a gear change actuator depending on the type of the vehicle.

The traveling state sensors 21 may include, for example, a vehicle speed sensor, a wheel rotational frequency sensor, a prime mover rotational frequency sensor, a braking pressure sensor, an accelerator manipulation amount sensor (or a throttle opening degree sensor), an acceleration sensor, a gyro sensor (IMU), a lean angle sensor, a suspension stroke sensor, a gear change position sensor, a clutch operation sensor, and the like. Instead of these, the traveling state sensors 21 may include other sensors. To be specific, the traveling state sensor information pieces detected by the traveling state sensors 21 may include a traveling speed of the lean vehicle 2, a rotational frequency of the front wheel 3, a rotational frequency of the rear wheel 4, a rotational frequency of the prime mover E, the braking pressure of the front brake unit 6, the braking pressure of the rear brake unit 7, the accelerator manipulation amount (acceleration requested amount) of the driver, acceleration of the vehicle body 5 in a predetermined direction (an upper-lower direction, a front-rear direction, a left-right direction, or the like), a rotational speed of the vehicle body 5 about a predetermined axis (a roll axis, a pitch axis, or the like), the lean angle, a gear change position of a transmission, an on state or off state of a clutch, and/or the like.

The controller 9 performs predetermined calculation based on the traveling state sensor information pieces and transmits control commands to various actuators, such as an electric throttle device, a fuel injector, and a spark plug, to control the driving force of the prime mover E. The control commands of the controller 9 and various sensor information pieces are also transmitted to the meter device 10. Moreover, the controller 9 may calculate traveling state calculation information pieces indicating the traveling states of the lean vehicle 2. In this case, the controller 9 periodically transmits the traveling state calculation information pieces to the meter device 10. The traveling state calculation information pieces may include, for example, tire force which acts on a tire of the front wheel 3 from a road surface, tire force which acts on a tire of the rear wheel 4 from the road surface, centrifugal force which acts on the lean vehicle 2 when the lean vehicle 2 turns, and the like. It should be noted that the traveling state calculation information pieces may be calculated by the mobile information terminal 11 or the server 12 instead of the controller 9.

The tire force may include vertical tire force Fx (see FIG. 1) acting in a tire vertical direction (front-rear direction) and lateral tire force Fy (see FIG. 1) acting in a tire lateral direction (left-right direction). The vertical tire force Fx can be calculated by a function which increases as the prime mover rotational frequency increases and decreases as the braking pressure increases. The lateral tire force Fy can be calculated by a function which increases as each of the lateral acceleration and the lean angle increases.

It should be noted that the above methods of calculating the vertical tire force Fx and the lateral tire force Fy are mere examples. The tire force may be calculated by a known calculation formula obtained from a motion equation regarding balance of force, such as centrifugal force (WO 2018/083912 A). Moreover, the tire force may be acquired based on an information piece obtained by detecting, by a sensor, force actually acting on the tire (JP 2018-161395 A).

The centrifugal force may be calculated from a detection signal of a lateral acceleration sensor and a detection signal of a lean angle sensor. A positional relation between the lateral acceleration sensor and the vehicle body 5 is fixed. Therefore, when the vehicle body 5 becomes the lean state, a detection direction of the lateral acceleration sensor also inclines relative to a horizontal surface integrally with the vehicle body 5. Therefore, the centrifugal force is calculated by calculating a horizontal component based on the lean angle from force obtained by multiplying the lateral acceleration, detected by the lateral acceleration sensor, by mass. It should be noted that the above mass may be the weight of the lean vehicle 2 and is preferably a total of the weight of the lean vehicle 2 and the weight of the driver.

It should be noted that the centrifugal force may be calculated from the curvature of a traveling trajectory (curve trajectory) and vehicle speed data. Moreover, the centrifugal force may be calculated based on an acceleration rate in a yaw direction and an acceleration rate in the roll direction. Furthermore, as disclosed in JP 2017-65561 A, force which balances the inclination angle (movable body lean angle) of the entire movable body, which includes the vehicle and the driver, in a vehicle width direction may be calculated as the centrifugal force.

The controller 9 controls the prime mover E and/or the brake control device 8 based on the traveling state sensor information pieces received from the traveling state sensors 21. When the controller 9 determines based on the traveling state sensor information pieces received from the traveling state sensors 21 that a predetermined event (for example, slip, wheel lock, or wheelie) has occurred, the controller 9 executes event suppressing control (for example, traction control, ABS control, or wheelie suppressing control) of suppressing the occurrence of the event. The controller 9 transmits, as control information pieces, an information piece indicating the start of the execution of the event suppressing control and an information piece indicating the termination of the execution of the event suppressing control to the meter device 10.

The satellite positioning sensor 22 receives an own vehicle position information piece from a positioning satellite. It should be noted that a position detecting function of the mobile information terminal 11 may be used instead of the satellite positioning sensor 22. Moreover, instead of the satellite positioning sensor 22, the own vehicle position information piece may be calculated by cumulatively calculating a travel distance and a travel direction obtained from a vehicle speed sensor and a direction sensor.

The user manipulating unit 23 is a user interface to which the driver inputs information pieces. The user manipulating unit 23 may be used to, for example, select traveling modes. The traveling modes may include a low fuel consumption traveling mode, a high output traveling mode, and an auto cruise traveling mode. Moreover, when the lean vehicle 2 is a hybrid vehicle, the traveling modes may include an engine traveling mode, an EV traveling mode, and a HEV traveling mode. An information piece of the traveling mode selected by the user manipulating unit 23 is a mode selection information piece indicating the traveling mode of the lean vehicle 2.

The meter device 10 transmits the vehicle state information piece together with the vehicle identification information piece to the mobile information terminal 11 through the short-range wireless communication technology. The vehicle state information piece includes at least one of a traveling information piece, the control information piece, and the mode selection information piece. It should be noted that the vehicle state information piece may include another information piece instead of the above information pieces. The traveling information piece includes at least one of the traveling state sensor information piece and the traveling state calculation information piece. The vehicle identification information piece includes an information piece for identifying an individual vehicle and is selected from a meter ID (meter part number information piece) stored in the meter device 10, a controller ID (vehicle identification number; VIN) stored in the controller 9, and the like.

The meter device 10 reads the vehicle identification information piece from a storage unit of the meter device 10 or a storage unit of the controller 9 and wirelessly transmits the vehicle identification information piece to an external device. The vehicle identification information piece may include a serial number. For example, the vehicle identification information piece may include information pieces indicating a manufacturer, a vehicle attribute, a year of manufacture, a manufacturing factory, a serial number, and/or the like. The vehicle attribute includes an information piece indicating the type of the vehicle. The vehicle identification information piece includes at least an information piece by which the type of the vehicle on which the controller 9 and the meter device 10 are mounted can be specified.

The mobile information terminal 11 is configured to be communicable through a network N with the server 12 arranged at a fixed facility located at a position away from the vehicle 2. The server 12 may communicate with the mobile information terminals 11 of the users of a large number of lean vehicles 2 and accumulate data received from the mobile information terminals 11.

Figure 3:
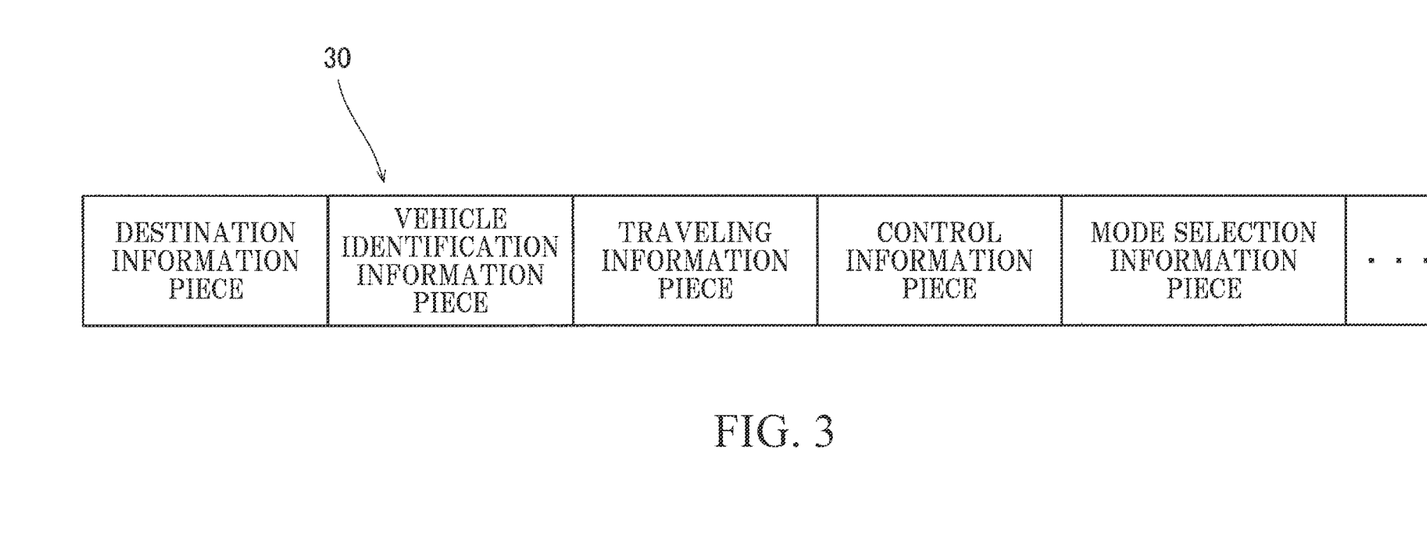
FIG. 3 is a diagram showing a format of a signal transmitted from a meter device of FIG. 2.

FIG. 3 is a diagram showing a format of a signal 30 transmitted from the meter device 10 of FIG. 2. As shown in FIG. 3, the signal 30 transmitted from the meter device 10 includes a destination information piece, the vehicle identification information piece, the traveling information piece, the control information piece, the mode selection information piece, and the like. The destination information piece is an identification information piece of the mobile information terminal 11 as a transmission destination and is, for example, acquired by the meter device 10 by pairing processing between the meter device 10 and the mobile information terminal 11. The vehicle identification information piece is an ID information piece specific to the individual lean vehicle 2 and is, for example, stored in the meter device 10 in advance. The signals 30 are sequentially transmitted from the meter device 10 as time passes (i.e., periodically) during traveling. A transmission timing may be changed. The number of information pieces in the signal 30 may be suitably reduced.

Figure 4:
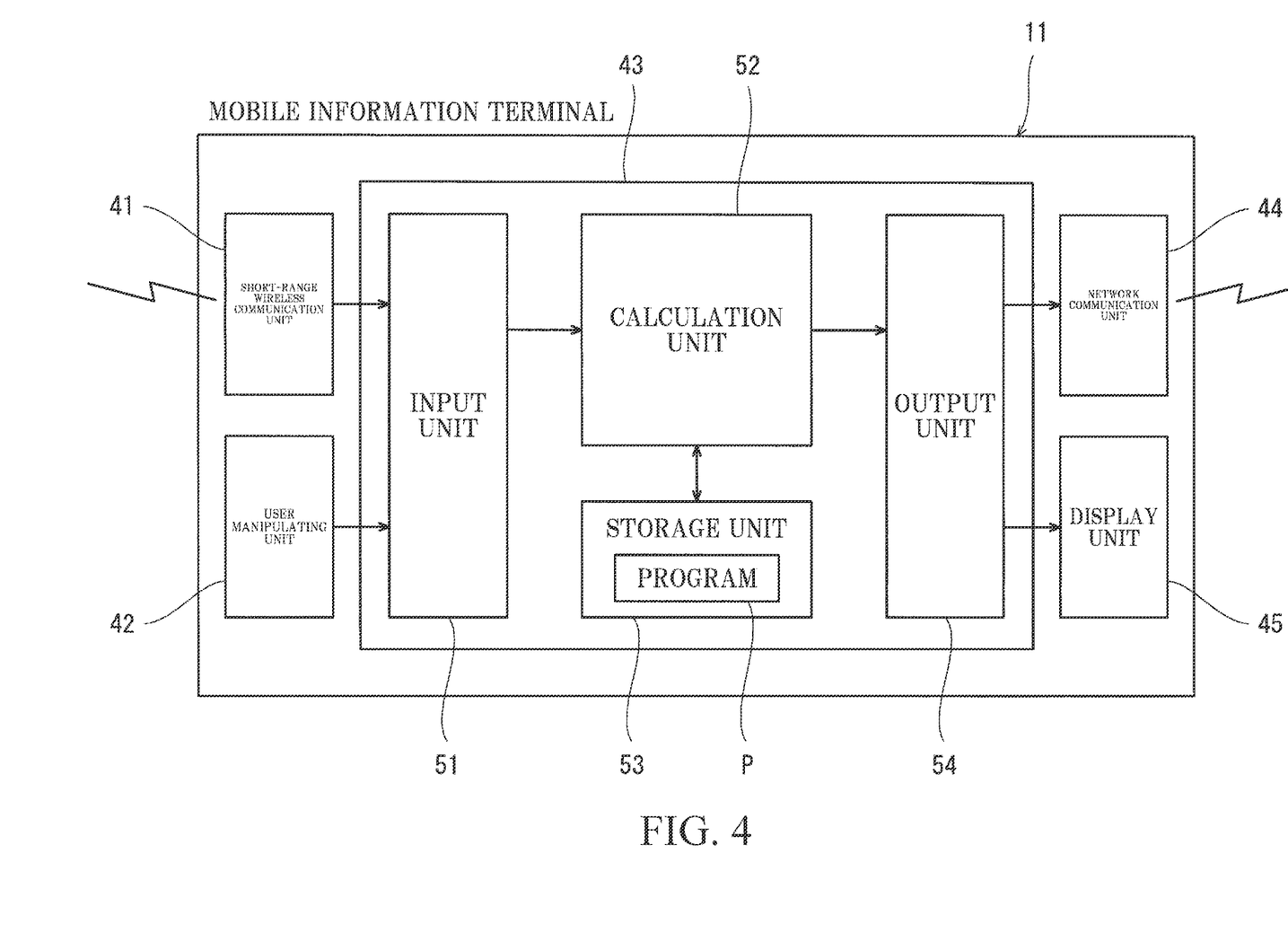
FIG. 4 is a block diagram of a mobile information terminal of FIG. 2.

FIG. 4 is a block diagram of the mobile information terminal 11 of FIG. 2. As shown in FIG. 4, the mobile information terminal 11 includes a short-range wireless communication unit 41, a user manipulating unit 42, a control module 43, a network communication unit 44, and a display unit 45. The short-range wireless communication unit 41 is communicable with the meter device 10 through the short-range wireless communication technology and receives the signal 30 (see FIG. 3) from the meter device 10. A user of the mobile information terminal 11 performs an input operation with respect to the user manipulating unit 42. The user manipulating unit 42 is, for example, a touch panel.

The control module 43 is a control board on which a processor, a non-transitory storage device, a transitory storage device, an I/O interface, and the like are mounted. The network communication unit 44 is configured to be communicable with the network N through a network line (for example, a public data communication network or a wireless LAN). The display unit 45 is a display device (for example, a touch panel) configured to display an image.

The control module 43 includes an input unit 51, a calculation unit 52, a storage unit 53, and an output unit 54 as functions. The input unit 51 and the output unit 54 are realized by the I/O interface. The calculation unit 52 is realized by the processor. The storage unit 53 is realized by the non-transitory storage device. The calculation unit 52 performs calculation processing by utilizing the transitory storage device based on a program stored in the non-transitory storage device.

The storage unit 53 stores a vehicle-related output program P. In accordance with the manipulation of the user by the user manipulating unit 42, the vehicle-related output program P may be downloaded to the mobile information terminal 11 through the network N and stored in the storage unit 53. Plural types of image information pieces stored in the storage unit 53 accompany the vehicle-related output program P. The image information pieces include plural types of vehicle image information pieces prepared for the respective types of the vehicles and plural types of background image information pieces.

The vehicle image information piece is an image information piece indicating appearance of the lean vehicle 2. The plural types of vehicle image information pieces are image information pieces corresponding to respective vehicles which are different in appearance from each other. To be specific, the plural types of vehicle image information pieces are image information pieces of vehicles which are different in the type of the vehicle and/or coloring from each other. The background image information piece is an image information piece indicating a background (a road surface, sky, buildings, nature, and the like) of a location where the lean vehicle 2 travels. It should be noted that the plural types of vehicle image information pieces and/or the plural types of background image information pieces may not be collectively stored in the storage unit 53, and only the image information pieces necessary for the displaying of the display unit 45 may be downloaded from the server 12 through the network communication unit 44.

Plural types of vehicle specification information pieces stored in the storage unit 53 accompany the vehicle-related output program P. The vehicle specification information piece includes at least one of the weight of the vehicle, the positions of the traveling state sensors in the vehicle, and the geometry (dimension) of the vehicle. The plural types of vehicle specification information pieces may be prepared for the respective types of the vehicles and may be different from each other. It should be noted that the plural types of vehicle specification information pieces may not be collectively stored in the storage unit 53, and only the vehicle specification information pieces necessary for calculation in the calculation unit 52 may be downloaded from the server 12 through the network communication unit 44.

Conformity information pieces stored in the storage unit 53 accompany the vehicle-related output program P. The conformity information pieces are set for the respective vehicle identification information pieces. The conformity information pieces may include correspondence relations between the vehicle identification information pieces and the plural types of vehicle image information pieces. The conformity information pieces may include correspondence relations between the vehicle identification information pieces and the plural types of vehicle specification information pieces. To be specific, the vehicle image information piece corresponding to the vehicle identification information piece and/or the vehicle specification information piece corresponding to the vehicle identification information piece can be specified by referring to the conformity information piece. It should be noted that the conformity information pieces may be stored in the server 12 without being stored in the storage unit 53 and may be referred by the calculation unit 52 from the server 12 through the network communication unit 44.

Hereinafter, record processing and output processing will be described as processing that the vehicle-related output program P makes the mobile information terminal 11 execute.

First, the record processing will be described. Before the start of the traveling, the driver manipulates the user manipulating unit 42 to command the start of the recording. With this, the vehicle-related output program P makes the mobile information terminal 11 start the recording of the vehicle identification information piece and the vehicle state information piece received from the meter device 10. Then, while the lean vehicle 2 is traveling, the short-range wireless communication unit 41 receives the signals 30 (see FIG. 3) periodically transmitted from the meter device 10. The vehicle state information pieces (the traveling information piece, the control information piece, and the mode selection information piece) among the information pieces included in the signals 30 are associated with the vehicle identification information piece and are then input to the input unit 51.

The calculation unit 52 stores in the storage unit 53 the vehicle state information piece and the vehicle identification information piece which are input to the input unit 51. It should be noted that the calculation unit 52 may transmit the vehicle state information piece and the vehicle identification information piece, received by the input unit 51, to the server 12 through the output unit 54 and the network communication unit 44. Then, at the termination of touring, the driver manipulates the user manipulating unit 42 to command the termination of the recording. With this, the vehicle-related output program P makes the mobile information terminal 11 terminate the recording.

Next, the output processing will be described. The driver manipulates the user manipulating unit 42 to command the start of the output. With this, the vehicle-related output program P makes the calculation unit 52 perform predetermined calculation based on the vehicle state information piece recorded in the storage unit 53 in the record processing and the conformity information piece stored in the storage unit 53. Then, the vehicle-related output program P generates the result of the calculation as an output information piece and makes the output unit 54 output the output information piece. When the vehicle state information piece recorded in the storage unit 53 has a gap in terms of time sequence, data in the gap may be interpolated by adjacent data.

The calculation unit 52 refers to the conformity information piece, specifies the vehicle image information piece corresponding to the vehicle identification information piece, and selects the specified vehicle image information piece as the output information piece. With this, the vehicle image information pieces differ depending on the types (kinds) of the vehicles indicated by the vehicle identification information pieces. Moreover, in the above calculation, the calculation unit 52 refers to the conformity information piece, specifies the vehicle specification information piece corresponding to the vehicle identification information piece, and calculates as the output information piece the traveling state calculation information piece from the vehicle state information piece based on the specified vehicle specification information piece. With this, the traveling state calculation information pieces may differ depending on the types of the vehicles indicated by the vehicle identification information pieces.

The above calculation includes a condition (for example, a constant condition for defining a relation between the vehicle state information piece and the traveling state calculation information piece) for calculating the traveling state calculation information piece from the vehicle state information piece, and the condition differs among the vehicle identification information pieces. The output unit 54 transmits the image information piece and the traveling state calculation information piece to the display unit 45 and makes the display unit 45 display (output) the image information piece.

Figure 5:
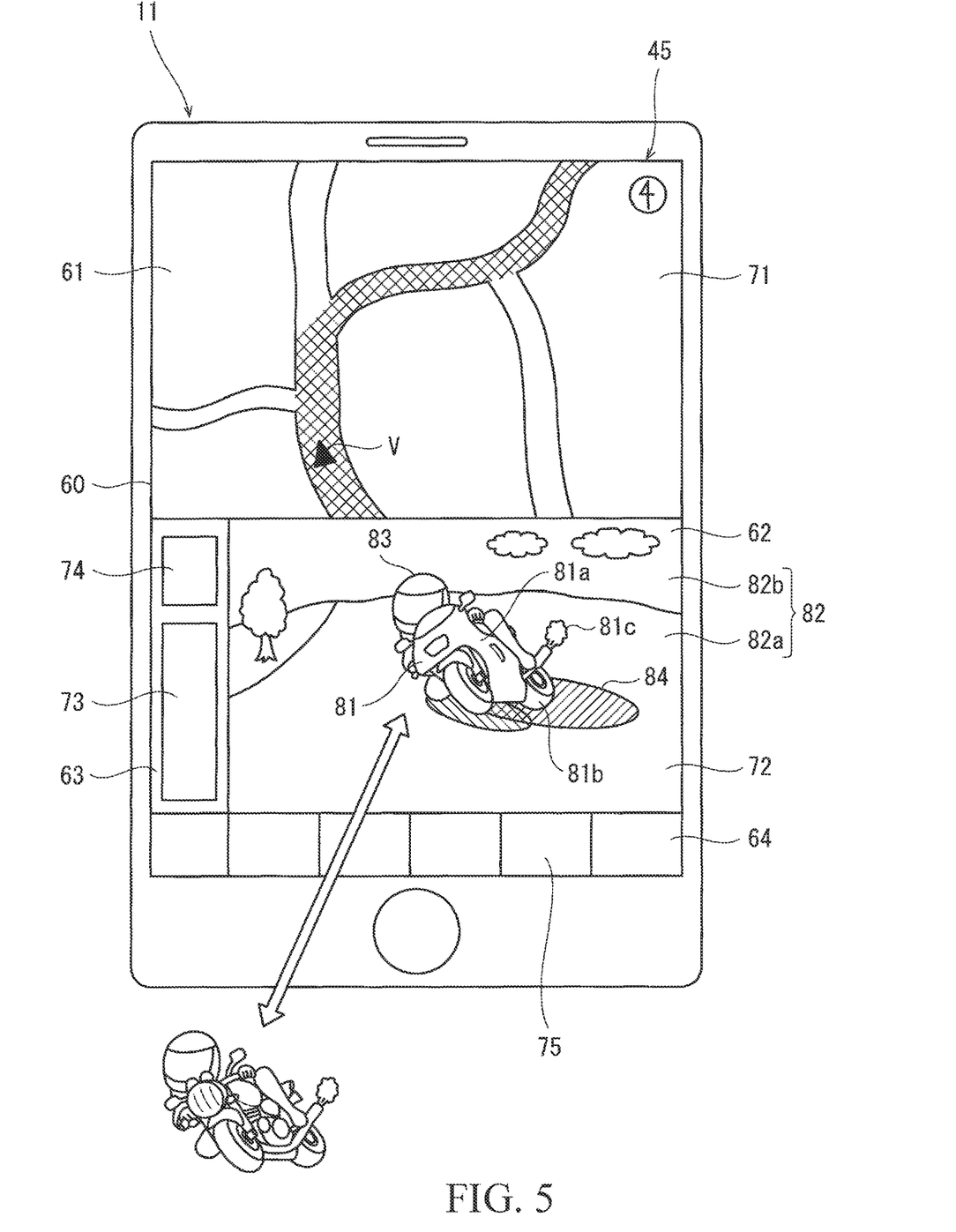
FIG. 5 is a diagram showing a display screen image of the mobile information terminal of FIG. 2.

FIG. 5 is a diagram showing a display screen image of the display unit 45 of the mobile information terminal 11 of FIG. 2. As shown in FIGS. 4 and 5, as the output processing that the vehicle-related output program P makes the mobile information terminal 11 execute, the output information piece is displayed on the display unit 45. A display screen image 60 displayed on the display unit 45 is divided into a plurality of segments 61 to 64. It should be noted that the display screen image 60 does not have to be divided into a plurality of segments and may be a single screen image. A first segment 61 displays a map image 71. The map image 71 may display a traveling position V of the lean vehicle 2 on a map. The map image 71 may be acquired from an existing navigation system. The traveling position V may be acquired from a detection information piece of the satellite positioning sensor 22 of the traveling state sensor information piece.

A second segment 62 displays a traveling moving image 72 of the lean vehicle 2 at the traveling position V of the first segment 61. The traveling moving image 72 is displayed as a moving image by using the image information piece as the output information piece generated by the calculation unit 52. The image information piece may include a vehicle image 81, a background image 82, a driver image 83, a traveling state image 84, and the like. The vehicle image 81 is displayed based on the vehicle image information piece. The vehicle image 81 may include a vehicle body image 81a, a wheel image 81b, an exhaust image 81c, and the like.

The calculation unit 52 specifies the vehicle image information piece based on the vehicle identification information piece. Since the vehicle image 81 is displayed based on the specified vehicle image information piece, the vehicle image 81 displays the same appearance as the type of the actual lean vehicle 2. To be specific, the vehicle images 81 may differ depending on the vehicle identification information pieces.

Specifically, the shape of the appearance of the vehicle body to be displayed differs among the vehicle images 81. For example, the shape of a cowling, the presence or absence of the cowling, the position of a head light, the shape of the head light, the coloring, the presence or absence of an accessory, and the like are changed in accordance with the vehicle identification information piece. Moreover, when the driver changes the vehicle, the type of the vehicle shown in the vehicle image 81 is automatically changed in accordance with the vehicle identification information piece of the changed vehicle. Moreover, the vehicle images 81 may be set such that differences among the types of the vehicles become noticeable and are emphasized. Moreover, when on-vehicle parts, such as a brake part and a suspension part, are different among the types of the vehicles, the vehicle image 81 may be emphatically displayed such that the differences can be clearly and visually recognized. For example, when the types of the vehicles are the same as each other, optional parts may be emphatically displayed. Moreover, the color of a region, such as a fuel tank, having a relatively large area in the vehicle image 81 may be made to differ among the types of the vehicles, and with this, the differences of the types of the vehicles may be made to be easily recognized.

The calculation unit 52 changes the image information piece based on the vehicle state information piece. For example, the vehicle image 81 displays the lean state of the vehicle inclined in the roll direction such that the lean angle of the vehicle becomes the lean angle obtained from the vehicle state information piece corresponding to the turning of the vehicle. Even when the traveling state sensor information pieces are the same as each other, the calculation unit 52 may make the lean angles differ depending on the types of the vehicles corresponding to the vehicle identification information pieces. To be specific, in consideration that the vehicle specification information pieces (for example, sensor mounting positions) differ depending on the types of the vehicles, the calculation unit 52 may calculate the lean angle (traveling state calculation information piece) from the traveling state sensor information piece based on the vehicle specification information piece corresponding to the vehicle identification information piece, and the vehicle image 81 may be displayed such that the lean angle of the vehicle becomes the calculated lean angle.

The calculation unit 52 may display the vehicle inclined in a pitch direction such that a pitch angle of the vehicle becomes a pitch angle obtained from the vehicle state information piece corresponding to wheelie (or jackknife). At this time, even when the traveling state sensor information pieces are the same as each other, the calculation unit 52 may make the pitch angles differ depending on the types of the vehicles corresponding to the vehicle identification information pieces. To be specific, in consideration that the vehicle specification information pieces (for example, the sensor mounting positions) differ depending on the types of the vehicles, the calculation unit 52 may calculate the pitch angle (traveling state calculation information piece) from the traveling state sensor information piece based on the vehicle specification information piece corresponding to the vehicle identification information piece, and the vehicle image 81 may be displayed such that the pitch angle of the vehicle becomes the calculated pitch angle. Moreover, the calculation unit 52 may perform emphasized display (amplified display) of the vehicle image 81 such that the pitch angle of the vehicle image 81 becomes larger than the actual pitch angle.

The calculation unit 52 changes a wheel rotational speed, shown by the wheel image 81b, based on an information piece regarding the vehicle speed included in the vehicle state information piece. To be specific, the calculation unit 52 increases the wheel rotational speed shown by the wheel image 81b as the vehicle speed increases. With this, the user can visually recognize the vehicle speed by the rotational speed shown by the wheel image 81b.

The calculation unit 52 changes a state (on or off) of a tail lamp shown by the vehicle image 81 based on a brake information piece included in the vehicle state information piece. With this, only by viewing the vehicle image 81, the user can visually recognize whether or not the brake is operating.

When the prime mover E is an engine, the calculation unit 52 may change the exhaust image 81c based on an information piece regarding rotation acceleration of the engine included in the vehicle state information piece. For example, when the rotation acceleration of the engine is a positive value, the calculation unit 52 may display the exhaust image 81c. Moreover, when the rotation acceleration of the engine is zero or a negative value, the calculation unit 52 may not display the exhaust image 81c. As the rotation acceleration (positive value) of the engine increases, the calculation unit 52 may increase the size of the exhaust image 81c and/or the depth of color of the exhaust image 81c.

The background image 82 is displayed based on the background image information piece. The background image 82 may include a ground image 82a and a sky image 82b. The ground image 82a is an image including the road surface and the like. The sky image 82b is an image of sky corresponding to weather and time during traveling. The calculation unit 52 may change the background image 82 based on the information piece regarding the vehicle speed included in the vehicle state information piece. The calculation unit 52 increases a movement speed of the background image 82 as the vehicle speed increases. With this, the user can visually recognize the vehicle speed by the movement shown by the background image 82. The calculation unit 52 makes the movement of the ground image 82a correspond to the wheel rotational speed shown by the wheel image 81b. The calculation unit 52 makes the movement of the sky image 82b slower than the movement of the ground image 82a. It should be noted that the sky image 82b may be made stationary.

The driver image 83 is displayed based on the driver image information piece. The driver image 83 is an image displayed so as to overlap the vehicle image 81 such that the driver rides the lean vehicle 2. Based on the vehicle state information piece, the calculation unit 52 moves the driver, shown by the driver image 83, relative to the vehicle shown by the vehicle image 81. For example, the calculation unit 52 displays the driver image 83 such that the driver image 83 is displaced relative to the vehicle image 81 toward a lean side (turn inner side) in accordance with the lean angle included in the vehicle state information piece (lean-in/lean-out).

A displacement amount of the driver image 83 relative to the vehicle image 81 may be determined based on an unbalance amount between the lean angle and the centrifugal force determined based on the lateral acceleration and the vehicle weight. The weights of the optional parts may be added to the vehicle weight in such a manner that the user inputs the optional parts to the vehicle-related output program P. The user may input a body information piece (for example, a height, weight, and sex) to the vehicle-related output program P, and with this, the driver image 83 may be changed so as to correspond to the body information piece. The driver image 83 may be displayed by animation.

The traveling state image 84 is displayed based on the traveling state information piece. The traveling state image 84 is an image which shows the traveling state (for example, tire force) of the vehicle by a diagram (for example, a circle) and is displayed so as to overlap the vehicle image 81. The calculation unit 52 displays the traveling state image 84 based on the traveling state sensor information piece or traveling state calculation information piece included in the vehicle state information piece. For example, as the tire force included in the traveling state calculation information piece increases, the calculation unit 52 increases the size of the diagram displayed close to the wheel image 81b.

A third segment 63 may include a traveling state information piece display region 73 and a control information piece display region 74. The traveling state information piece display region 73 displays the traveling state information piece by a figure and/or a graph. The calculation unit 52 displays the traveling information piece (for example, a vehicle speed, an accelerator manipulation amount, and a prime mover rotational frequency) in the traveling state information piece display region 73 by a figure and/or a graph based on the traveling information piece included in the vehicle state information piece. The control information piece display region 74 displays the control information piece by, for example, a symbol. The calculation unit 52 displays the execution or non-execution of the event suppressing control (for example, traction control, ABS control, and wheelie suppressing control) by a symbol or the like based on the control information piece included in the vehicle state information piece.

A fourth segment 64 may include a user input region 75. The user input region 75 is an interface to which a user inputs a request regarding the displaying of the display screen image 60. For example, when the user manipulates the user input region 75 to input a view change request, the calculation unit 52 displays the vehicle image 81 by a different view (for example, a vehicle front view, a vehicle perspective view, a vehicle side view, a vehicle plan view, or a vehicle back view) requested by the user. For example, when the user manipulates the user input region 75 to input a reproduction speed change request, the calculation unit 52 changes a reproduction speed of the traveling moving image 72.

Figure 6:
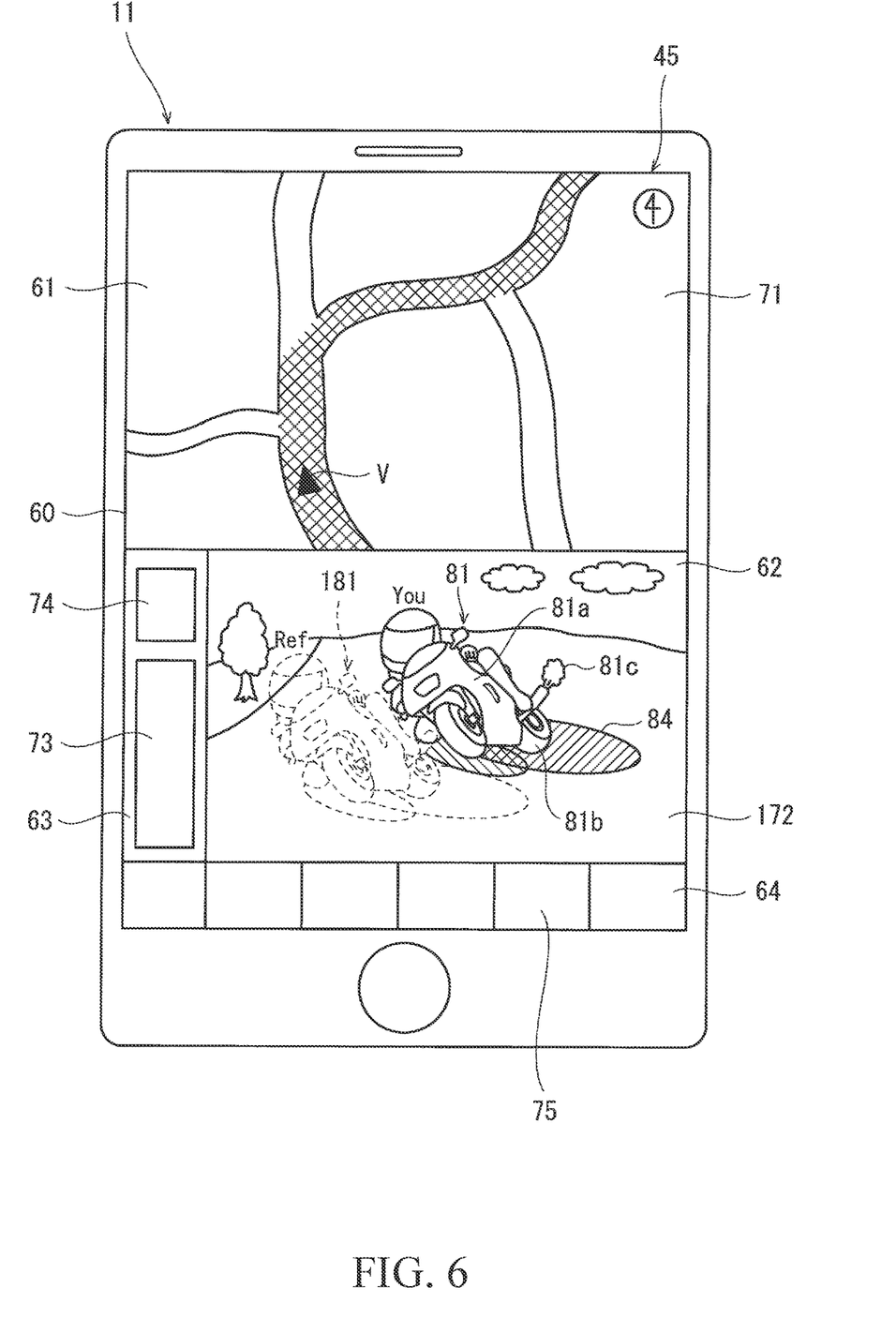
FIG. 6 is a diagram showing another display screen image of the mobile information terminal of FIG. 5.

FIG. 6 is a diagram showing another display screen image 60 of the mobile information terminal 11 of FIG. 5. A reference vehicle image 181 is displayed in a traveling moving image 172 of the second segment 62 in the display screen image 60 of FIG. 6. The reference vehicle image 181 may be a traveling moving image of a sample driver (for example, a model driver or a friend driver) or may be a traveling moving image of the same user on a different day (for example, a traveling moving image of a personal best). The reference vehicle image 181 is displayed such that the user can compare the reference vehicle image 181 with the vehicle image 81 in the same screen image. For example, the reference vehicle image 181 may be displayed as a transparent image so as to overlap the vehicle image 81.

Since the vehicle speed corresponding to the vehicle image 81 and the vehicle speed corresponding to the reference vehicle image 181 may be different from each other, a traveling time required until when the vehicle corresponding to the reference vehicle image 181 reaches the traveling position V from a departure spot may be different from a traveling time required until when the vehicle corresponding to the vehicle image 81 reaches the traveling position V from the departure spot. Therefore, when displaying the traveling position of the reference vehicle image 181 by using the actual traveling time, the reference vehicle image 181 may exist outside a display range of the traveling moving image 172.

Therefore, the calculation unit 52 corrects the traveling position of the reference vehicle image 181 such that the reference vehicle image 181 is displayed within the display range of the traveling moving image 172. The calculation unit 52 may correct the traveling position of the reference vehicle image 181 such that the traveling position of the reference vehicle image 181 is displayed at the same position as the traveling position of the vehicle image 81. The calculation unit 52 may correct the traveling position of the reference vehicle image 181 such that the traveling position of the reference vehicle image 181 is displayed at a position away from the traveling position of the vehicle image 81 toward a front side or a rear side in a proceeding direction by a predetermined distance.

According to the above configuration, since the output information pieces calculated based on the vehicle state information pieces transmitted from the lean vehicles 2 differ depending on the types of the vehicles, the appropriate output information piece corresponding to the type of the vehicle can be output. In this case, since the output information piece conforming to the type of the vehicle 2 is generated based on the vehicle identification information piece transmitted from the vehicle 2, the user does not have to input the type of the vehicle 2. Therefore, the appropriate output information piece corresponding to the type of the vehicle can be output while preventing the deterioration of the convenience of the user. For example, even when a plurality of vehicles of different types are driven by using the same mobile information terminal 11, and the record processing is performed by the vehicle-related output program P, the appropriate output information piece corresponding to the actual type of the vehicle can be output.

Moreover, since the image information piece includes the vehicle image information piece which differs among the vehicle identification information pieces, the reality of the image viewed by the user can be improved. Furthermore, since the image information piece changes based on the vehicle state information piece, the user can easily and visually recognize the change in the vehicle state information piece.

Moreover, the lean angle of the vehicle image information piece while the vehicle is turning is made to differ among the vehicle identification information pieces. Therefore, even when the position of the sensor of the vehicle in the left-right direction differs among the types of the vehicles, the appropriate lean angle can be output by processing the sensor information piece in accordance with the type of the vehicle.

Moreover, since at least one of the vehicle image information piece and the background image information piece is changed based on the information piece regarding the vehicle speed included in the vehicle state information piece, the user can easily and visually recognize the change in the vehicle speed.

Moreover, since the image information piece changes based on the control information piece included in the vehicle state information piece, the user can easily and visually recognize the change in the control information piece.

Moreover, in the image information piece, the driver indicated by the driver image information piece is moved relative to the vehicle indicated by the vehicle image information piece based on the vehicle state information piece. On this account, for example, the weight shift of the driver during turning can be expressed, and therefore, the reality of the image can be improved.

Moreover, since the image information piece is generated such that the vehicle indicated by the image information piece is displayed by a different view based on the user's request, the view of the image can be changed in accordance with the preference of the user.

Moreover, the condition of the above calculation is made to differ among the vehicle identification information pieces. Therefore, even when the correspondence relation between the vehicle state information piece and the output information piece may change depending on the type of the vehicle, the appropriate output information piece (for example, the lean angle, the centrifugal force, the inertial force, and the tire force) corresponding to the type of the vehicle can be generated.

The present invention is not limited to the above embodiment. Modifications, additions, and eliminations may be made with respect to the configuration of the embodiment. For example, the output unit 54 makes the display unit 45 display the output information piece, and in addition to this or instead of this, the output unit 54 may transmit the output information piece through the network communication unit 44 to the server 12. Moreover, an accessory information piece which can identify a vehicle accessory (for example, a pannier, a helmet, a glove, a rider jacket, and a sticker) can be input in the vehicle-related output program P, and the vehicle image 81 and/or the driver image 83 may be changed based on the accessory information piece.

For example, when the vehicle accessory is purchased, and then, user registration of the vehicle accessory is performed in association with the vehicle identification information piece (vehicle serial number), an information piece regarding the user registration may be transmitted to a server, and the server may store the accessory information piece in association with the vehicle identification information piece. In this case, plural types of image information pieces corresponding to the appearances of the vehicle accessories are stored in the server. For example, when user registration of a pannier purchased is performed, the image output to the mobile information terminal 11 is changed to an image of the vehicle equipped with the pannier by the vehicle-related output program P. When the driver purchases the above vehicle accessory and performs the user registration, the vehicle image displayed changes in accordance with the user registration (without special manipulation by the user).

Figure 7:
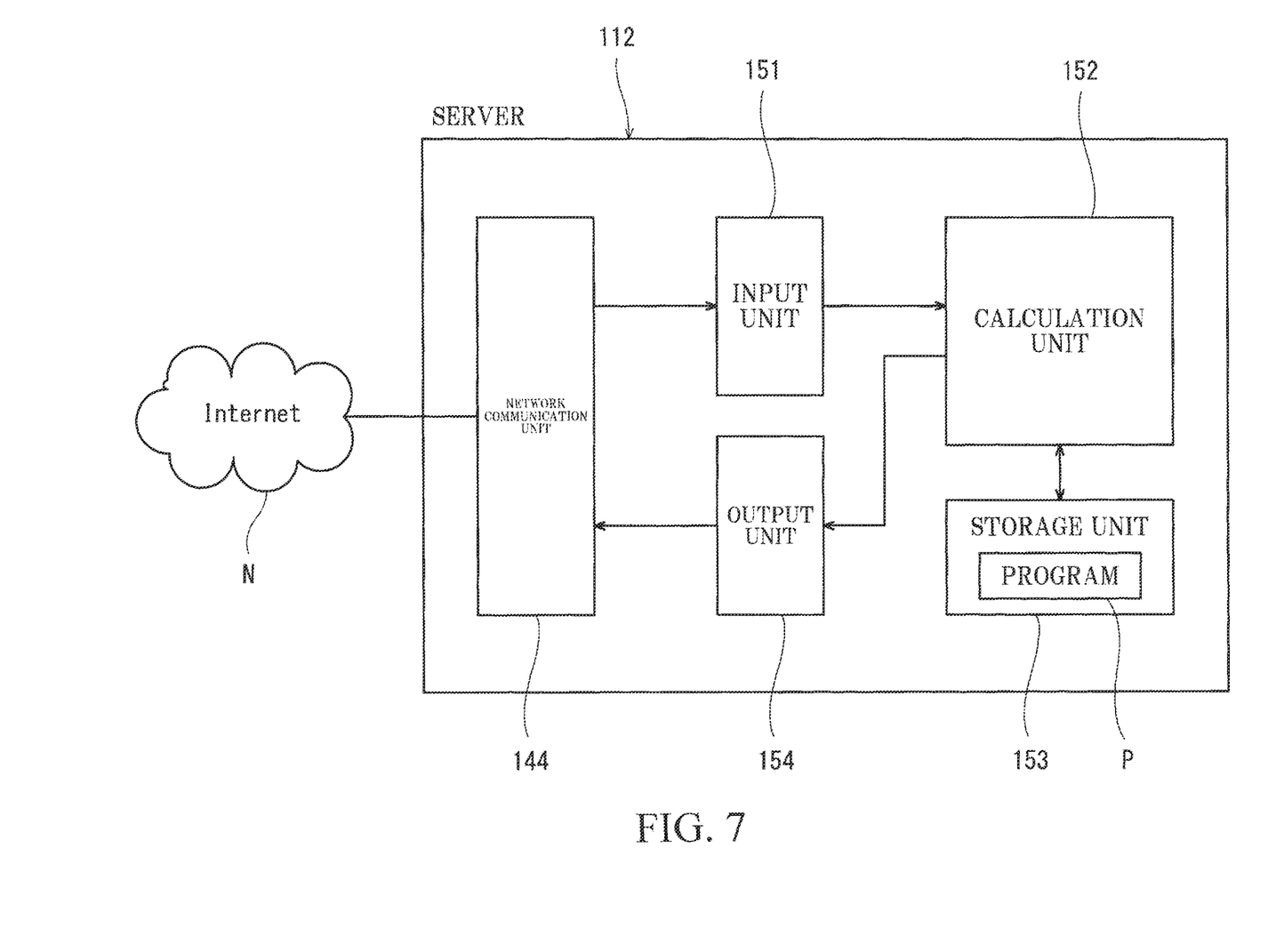
FIG. 7 is a block diagram showing a server to which the vehicle-related output system according to a modified example is applied.

The vehicle-related output program P may be installed in a server 112 (computer) instead of the mobile information terminal 11. In this case, as shown in FIG. 7, the server 112 includes, for example, a network communication unit 144, an input unit 151, a calculation unit 152, a storage unit 153, and an output unit 154. The network communication unit 144 is communicable with the network N. The input unit 151 and the output unit 154 are realized by the I/O interface. The calculation unit 152 is realized by the processor. The storage unit 153 is realized by the non-transitory storage device. The calculation unit 152 performs calculation processing by utilizing the transitory storage device based on the program stored in the non-transitory storage device.

The storage unit 153 stores the vehicle-related output program P. The vehicle-related output program P makes the server 112 execute the record processing and the output processing. The vehicle state information piece and the vehicle identification information piece are received by the network communication unit 144 through the network N. Then, the vehicle state information piece and the vehicle identification information piece are input to the calculation unit 152 through the input unit 151 and are recorded in the storage unit 153. The output information piece generated by the calculation unit 152 in accordance with the vehicle-related output program P is transmitted from the output unit 154 and the network communication unit 144 through the network N to the mobile information terminal 11. With this, as the output processing, the server 112 makes the mobile information terminal 11 display the output information piece.

Regardless of the type of the vehicle, the image may be changed in accordance with an information piece, such as a vehicle model, a manufacturing factory, and a vehicle destination, included in the vehicle identification information piece. For example, when the coloring of the vehicle differs depending on the vehicle model, the coloring of the image may be made to differ. Moreover, an announcement information piece corresponding to the vehicle identification information piece may be informed to the driver by image display. For example, together with the image, a sales promotion information piece, a recall information piece, and the like can be informed for each type of the vehicle.

The output image may be displayed on a non-mobile output display device, such as a desktop, instead of the mobile information terminal. Calculation may be performed by a server instead of the mobile information terminal, and the server may transmit a calculation result to a display device. A transmitter mounted on the vehicle itself may transmit an information piece to a server. A computer, such as the mobile information terminal, in which the vehicle-related output program P is installed does not necessarily have to be connected to a server (and may be a stand-alone computer).

The change of the image and the change of the calculation coefficient in accordance with the vehicle type information piece have been described. However, only one of the change of the image and the change of the calculation coefficient may be executed. For example, when a coefficient for obtaining the output information piece regarding the lean state is changed for each type of the vehicle, a calculated lean information piece may be stored in a server or the like.

A calculation value (for example, the tire force) other than the lean information piece or a predetermined evaluation value may be output based on an information piece prepared for each vehicle type information piece. When output sound (for example, engine sound) during traveling differs among the types of the vehicles, the traveling state imitating the engine sound corresponding to the type of the vehicle may be output.

The vehicle may be a vehicle other than the lean vehicle, such as a motorcycle. The vehicle may be a four-wheeled vehicle or a bicycle as long as the vehicle can transmit the vehicle information piece. Instead of the meter device 10, a prime mover control device, a brake control device, or the like may transmit the vehicle information piece to the mobile information terminal. The vehicle information piece may be transmitted from the traveling state sensor through a wireless device to the mobile information terminal or an external device, such as a server, without through the controller.

What is claimed is:

1. A non-transitory storage device storing a vehicle-related output program that when executed by a computer causes the computer to execute:
    a first receiving step of receiving a vehicle identification information piece transmitted from a vehicle;
    a second receiving step of receiving a vehicle state information piece transmitted from the vehicle;
    a calculating step of generating, as an output information piece, a result of predetermined calculation performed based on the vehicle state information piece; and
    an outputting step of outputting the output information piece, wherein:
        in the calculating step, a vehicle image information piece corresponding to the vehicle identification information piece is selected from plural types of vehicle image information pieces stored in a storage, the plural types of vehicle information pieces being prepared for respective types of vehicles; and
        in the outputting step, an image information piece including the selected vehicle image information piece is outputted as the output information piece.

2. The non-transitory storage device storing the vehicle-related output program according to claim 1, wherein in the calculating step, the image information piece is changed based on the vehicle state information piece.

3. The non-transitory storage device storing the vehicle-related output program according to claim 2, wherein:
    the image information piece further includes a background image information piece; and
    in the calculating step, at least one of the vehicle image information piece and the background image information piece is changed based on an information piece regarding a vehicle speed included in the vehicle state information piece.

4. The non-transitory storage device storing the vehicle-related output program according to claim 2, wherein in the calculating step, the image information piece is changed based on a control information piece included in the vehicle state information piece.

5. The non-transitory storage device storing the vehicle-related output program according to claim 1, wherein:
    the vehicle is a lean vehicle which turns in a lean state in which the vehicle is inclined in a roll direction;
    in the second receiving step, a lean angle transmitted from the lean vehicle is received as the vehicle state information piece;

in the calculating step the selected vehicle image information piece is generated such that the selected vehicle image information piece displays the vehicle inclined at the received lean angle; and in the outputting step, the image information piece including the selected vehicle image information piece displaying the vehicle inclined at the received lean angle is outputted.

6. The non-transitory storage device storing the vehicle-related output program according to claim 1, wherein:

the vehicle is a lean vehicle which turns while being inclined in a roll direction;

in the calculating step, the image information piece including a driver image information piece together with the vehicle image information piece is generated; and in the image information piece, a driver indicated by the driver image information piece is moved relative to the vehicle indicated by the vehicle image information piece based on the vehicle state information piece.

7. The non-transitory storage device storing the vehicle-related output program according to claim 1, causing the computer to further execute a third receiving step of receiving a user request, wherein in the calculating step, the image information piece is generated based on the user request such that the vehicle indicated by the image information piece is displayed in a different view.

8. The non-transitory storage device storing the vehicle-related output program according to claim 1, wherein in the calculating step, a condition of the calculation changes depending on a type indicated by the vehicle identification information piece.

9. The non-transitory storage device storing the vehicle-related output program according to claim 1, wherein:

the vehicle is a lean vehicle which turns in a lean state in which the vehicle is inclined in a roll direction; and in the calculating step, the output information piece regarding the lean state of the vehicle is generated, the generated output information piece changing depending on a type indicated by the vehicle identification information piece.

10. The non-transitory storage device storing the vehicle-related output program according to claim 1, wherein the output information piece includes a traveling state calculation information piece; and in the calculating step, a vehicle specification information piece corresponding to the vehicle identification information piece is selected from plural types of vehicle specification information pieces based on the vehicle identification information piece, and a traveling state calculation information piece is calculated from the vehicle state information piece based on the selected vehicle specification information piece.

11. The non-transitory storage device storing the vehicle-related output program according to claim 10, wherein the vehicle specification information piece includes at least one of a weight of the vehicle, a position of a traveling state sensor in the vehicle, and a geometry of the vehicle.

12. A vehicle-related output system comprising:

an input unit configured to receive a vehicle identification information piece transmitted from a vehicle and a vehicle state information piece transmitted from the vehicle;

a calculation unit configured to perform predetermined calculation based on the vehicle state information piece and generate a result of the calculation as an output information piece; and an output unit configured to output the output information piece, wherein:

the calculation unit selects a vehicle image information piece corresponding to the vehicle identification information piece from plural types of vehicle image information pieces stored in a storage, the plural types of vehicle information pieces being prepared for respective types of vehicles;

the output unit outputs an image information piece including the selected vehicle image information piece;

the vehicle is a lean vehicle which turns in a lean state in which the vehicle is inclined in a roll direction;

the input unit receives a lean angle transmitted from the lean vehicle as the vehicle state information piece;

the calculation unit generates the selected vehicle image information piece such that the selected vehicle image information piece displays the vehicle inclined at the received lean angle; and the output unit outputs the image information piece including the selected vehicle image information piece displaying the vehicle inclined at the received lean angle.

13. The vehicle-related output system according to claim 12, wherein the output information piece includes a traveling state calculation information piece; and the calculation unit is further configured to:

select a vehicle specification information piece corresponding to the vehicle identification information piece from plural types of vehicle specification information pieces based on the vehicle identification information piece, and calculate a traveling state calculation information piece from the vehicle state information piece based on the selected vehicle specification information piece.

14. The vehicle-related output system according to claim 13, wherein the vehicle specification information piece includes at least one of a weight of the vehicle, a position of a traveling state sensor in the vehicle, and a geometry of the vehicle.

15. A vehicle-related output method comprising:

a first receiving step of receiving a vehicle identification information piece transmitted from a lean vehicle which turns in a lean state in which the vehicle is inclined in a roll direction;

a second receiving step of receiving a vehicle state information piece transmitted from the vehicle;

a third receiving step of receiving a view change request inputted by a user;

a calculating step of generating, as an output information piece, a result of predetermined calculation performed based on the vehicle state information piece, the predetermined calculation changing depending on a type indicated by the vehicle identification information piece; and an outputting step of outputting the output information piece, wherein:

in the second receiving step, a lean angle transmitted from the lean vehicle is received as the vehicle state information piece;

in the calculating step, a vehicle image information piece is generated such that the vehicle image information piece displays the vehicle inclined at the received lean angle and displays the vehicle in a different view based on the view change request; and in the outputting step, an image information piece including the generated vehicle image information piece is outputted.

16. The vehicle-related output method according to claim 15, wherein the output information piece includes a traveling state calculation information piece; and in the calculating step:
- a vehicle specification information piece corresponding to the vehicle identification information piece is selected from plural types of vehicle specification information pieces based on the vehicle identification information piece, and
- a traveling state calculation information piece is calculated from the vehicle state information piece based on the selected vehicle specification information piece.

17. The vehicle-related output method according to claim 16, wherein the vehicle specification information piece includes at least one of a weight of the vehicle, a position of a traveling state sensor in the vehicle, and a geometry of the vehicle.

* * * * *